United States Patent Office 3,704,291
Patented Nov. 28, 1972

3,704,291
PENICILLINS DERIVED FROM THE REACTION OF ENAMINES WITH 6-ISOCYANATO PENICILLANIC ACID
Milton Wolf, West Chester, James L. Diebold, Havertown, and Stanley C. Bell, Penn Valley, Pa., assignors to American Home Products Corporation, New York, N.Y.
No Drawing. Filed Dec. 17, 1969, Ser. No. 886,021
Int. Cl. C07d 99/16
U.S. Cl. 260—239.1
3 Claims

ABSTRACT OF THE DISCLOSURE

Novel penicillanic acid derivatives possessing antibacterial activity have been prepared by the reaction of an enamine with 6-isocyanatopenicillanic acid trimethylsilyl ester.

DESCRIPTION OF THE INVENTION

The invention is concerned with the production of novel penicillanic acid derivatives of Formula I:

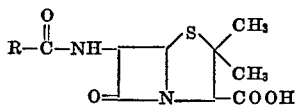

wherein R is selected from the group consisting of:

(a)

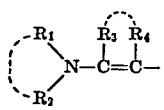

wherein $R_1$ and $R_2$ are (lower)alkyl; or $R_1$ and $R_2$ may be concatenated to form a heterocyclic ring selected from the group consisting of morpholino, piperidino, 4-alkyl-piperazino and pyrrolidino; $R_3$ and $R_4$ are selected from the group consisting of hydrogen and (lower)alkyl; or $R_3$ and $R_4$ may be concatenated to form a ring selected from the group consisting of cyclopentene, cyclohexene, cycloheptene and (b)

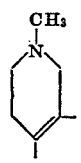

(c)

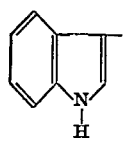

and when taken with $R_1$ and $R_2$ and the nitrogen atom to which they are attached, present the structure.

As used herein the term (lower)alkyl is employed to describe hydrocarbon groups having one to about six carbon atoms such as methyl, ethyl, propyl, i-propyl, hexyl etc. The term enamine is used to describe straight chain, branched chain, cyclic, substituted cyclic and fused ring structures containing the

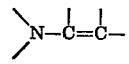

moiety.

The novel enamine substituted penicillanic acid derivatives of the invention are prepared by reacting the appropriate enamine reactant with the trimethylsilyl ester of 6-isocyanatopenicillanic acid. The reaction is conducted in an anhydrous organic solvent such as dried toluene, dried benzene or any other appropriate anhydrous solvent. Moisture is excluded to prevent the formation of a bis-type compound due to the reactivity of the 6-isocyanato group and also to prevent the hydrolysis of the trimethylsilyl ester substituent. The novel enamine penicillanic acid trimethylsilyl esters may be separated from the reaction mixture by in vacuo evaporation of the solvent. Optionally, the free enamine penicillanic acids may be directly prepared by adding water to the reaction mixture or by evaporating the solvent in a stream of air.

The 6-isocyanatopenicillanic acid trimethylsilyl ester employed as a starting material may be prepared as follows:

A solution of 60 mmoles of 6-aminopenicillanic acid trimethylsilylester in 250 ml. of toluene is slowly added dropwise, in a nitrogen atmosphere, to a well stirred mixture of 132 mmoles of triethylamine, about 150 mmoles of phosgene and 90 ml. of toluene; the temperature of the reaction mixture is kept below —40° C. Stirring is continued for 3 hours; the reaction mixture is then filtered under nitrogen at —40° C. The temperature is slowly allowed to rise from —40° C. while the combined filtrates are evaporated under reduced pressure to a final volume of 70 ml. The solution contains about 0.71 mmole of the trimethylsilylester of 6-isocyanatopenicillanic acid, per ml. of solution.

The novel compound of the invention are antibacterial agents useful in treating bovine mastitis and other infections amenable to therapy with penicillanic acid derivatives such as benzylpenicillin. They are also useful as growth promoters for ruminant animals such as cattle. The compounds of the invention are also useful for the inhibition of Staph. aureau, Smith at a concentration of less than 75 micrograms/ml. when applied in an aqueous vehicle.

The following examples are added to illustrate but not to limit the scope of the invention:

EXAMPLE I 6-(1,2,5,6-tetrahydro-1-methyl-4-morpholinonicotinamido)pencillanic acid A solution of 3.68 g. (0.0218 m.) of the morpholine enamine of N-methyl-4-piperidone in 25 ml. of toluene and a solution of 20 ml. (0.0218 m.) of trimethylsilyl 6-isocyanatopenicillanate in toluene are added simultaneously to a stirred solution of 25 ml. of toluene at 25° C. After stirring for 12 hours, the solution is evaporated in a stream of air. The residue is slurried with ethyl ether and filtered giving the titled compound as a yellow solid.

EXAMPLE II

6-(indole-3-carboxamido)penicillanic acid

To a solution of 0.63 g. (0.0054 m.) of indole and 5 ml. of pyridine in 10 ml. of toluene is slowly added 5 ml. (0.0054 m.) of trimethylsilyl 6-isocyanatopenicillanate. The solution is stirred at 25° C. for 11 days and then evaporated in a stream of air. The residue is washed with ethyl ether giving a tan colored solid.

EXAMPLE III

By methods analogous to those employed in Example II, the following compounds are prepared:

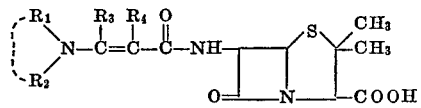

| $R_1$ | $R_2$ | $R_3$ | $R_4$ |
|---|---|---|---|
| $CH_3$ | $CH_3$ | H | H |
| $C_2H_5$ | $C_2H_5$ | H | H |
| $C_3H_7$ | $C_3H_7$ | H | $CH_3$ |
| $CH_3$ | $CH_3$ | $C_2H_5$ | H |
| $CH_3$ | $CH_3$ | $C_3H_7$ | H |
| $C_2H_5$ | $C_2H_5$ | $CH_3$ | $CH_3$ |
| $CH_3$ | $CH_3$ | H | $C_2H_5$ |
| $CH_3$ | $CH_3$ | H | $C_3H_7$ |
| $C_4H_9$ | $C_4H_9$ | H | $CH_3$ |
| $CH_3$ | $CH_3$ | H | $C_4H_9$ |
| $CH_3-N\diagdown$ (ring) | | H | $CH_3$ |
| (pyrrolidine) | | $CH_3$ | H |
| $CH_3$ | $CH_3$ | (cyclobutyl) | |
| $CH_3$ | $CH_3$ | (cyclopentyl) | |
| $CH_3$ | $CH_3$ | (cyclohexyl) | |

We claim:

1. A compound of the formula:

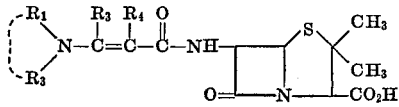

in which
$R_1$ and $R_2$, separately are alkyl of 1 to 6 carbon atoms, and when combined with the nitrogen atom to which they are bonded form a ring structure selected from the group consisting of

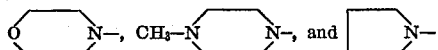

$R_3$ and $R_4$, separately are selected from the group consisting of —H and alkyl of 1 to 6 carbon atoms and when combined form a member of the group consisting of

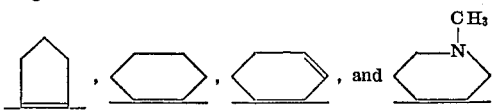

2. The compound of claim 1 which is:

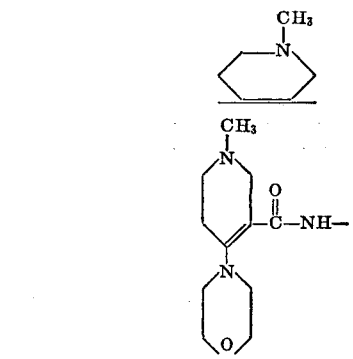

3. A compound of the formula:

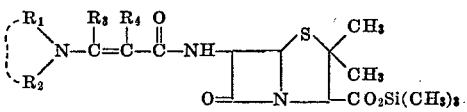

in which
$R_1$ and $R_2$, separately are alkyl of 1 to 6 carbon atoms, and when combined with the nitrogen atom to which they are bonded form a ring structure selected from the group consisting of

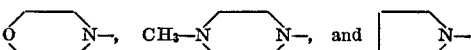

$R_3$ and $R_4$, separately are selected from the group consisting of —H and alkyl of 1 to 6 carbon atoms and when combined form a member of the group consisting of

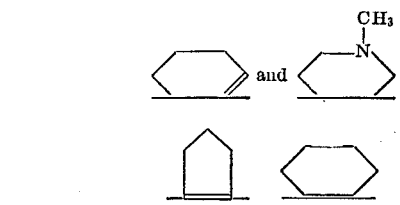

References Cited

UNITED STATES PATENTS 3,352,850   11/1967   Doyle et al. _____ 260—239.1

NICHOLAS S. RIZZO, Primary Examiner

U.S. Cl. X.R.

424—271